H. DECREMER.
GRAIN MEASURING CHUTE.
APPLICATION FILED APR. 27, 1910.

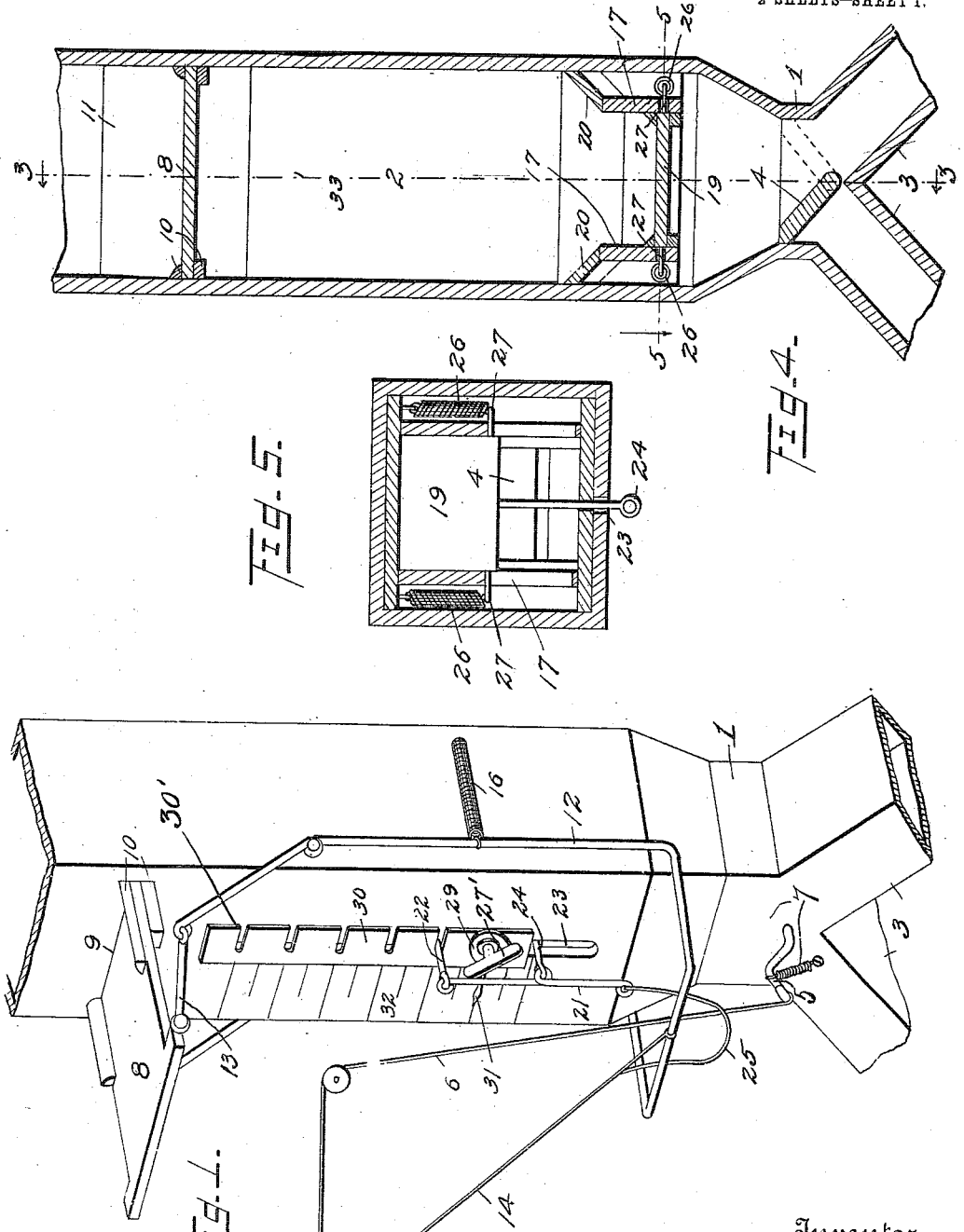

985,329.

Patented Feb. 28, 1911.

2 SHEETS—SHEET 2.

Witnesses
E. W. Duffy
C. H. Griesbauer

Inventor
H. Decremer
by H. B. Willson & Co
Attorneys

UNITED STATES PATENT OFFICE.

HENRY DECREMER, OF PERKINS, MICHIGAN.

GRAIN-MEASURING CHUTE.

985,329. Specification of Letters Patent. Patented Feb. 28, 1911.

Application filed April 27, 1910. Serial No. 557,890.

*To all whom it may concern:*

Be it known that I, HENRY DECREMER, a citizen of the United States, residing at Perkins, in the county of Delta and State of Michigan, have invented certain new and useful Improvements in Grain-Measuring Chutes; and I do declare the following to be a full, clear, and exact description of the invention, such as will enable others skilled in the art to which it appertains to make and use the same.

This invention relates to improvements in grain measuring chutes.

One object of the invention is to provide a grain measuring chute having means whereby the measuring mechanism may be adjusted to measure and deliver any quantity of grain desired.

Another object is to provide means whereby the measuring and delivering mechanism may be operated from any desired place and at a distance from the chute.

With these and other objects in view, the invention consists of certain novel features of construction, combination and arrangement of parts as will be more fully described and particularly pointed out in the appended claim.

Figure 3:
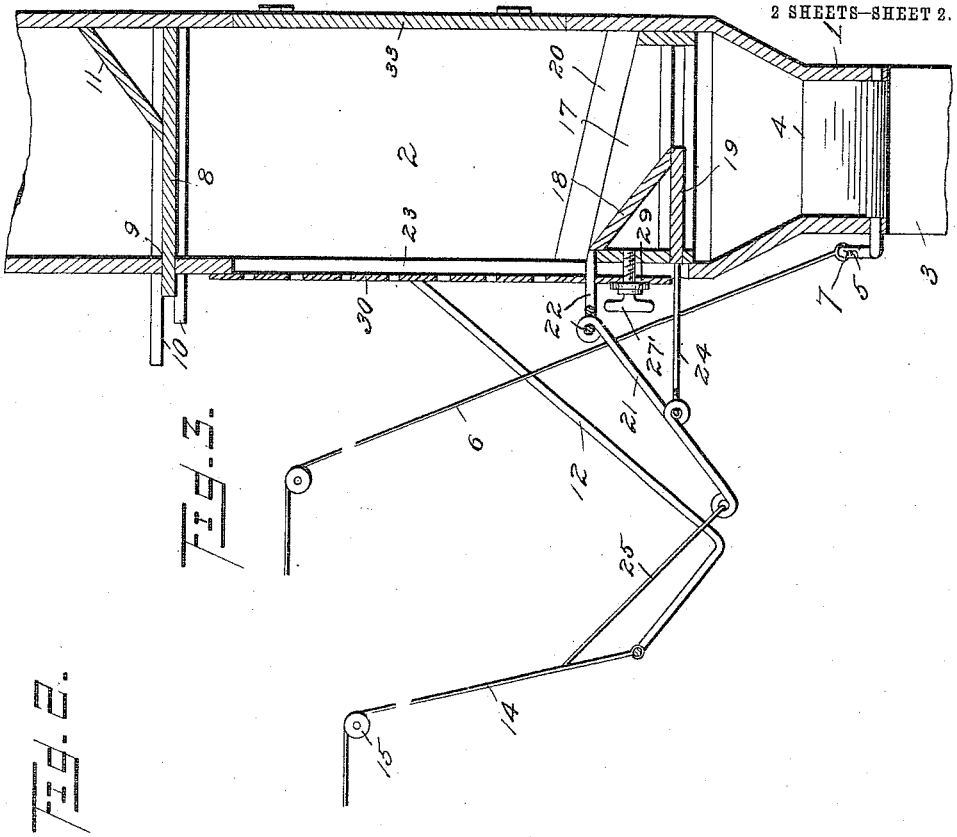
Figure 2:
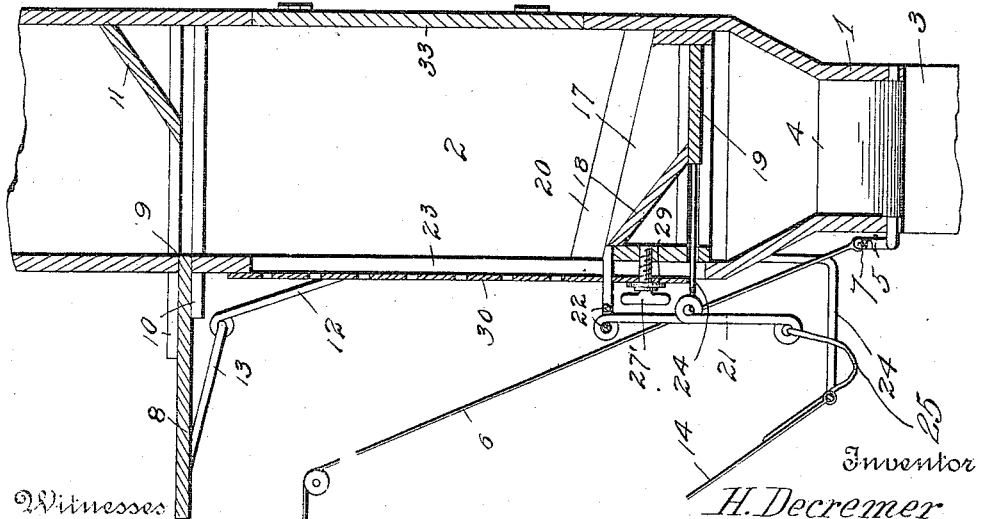

In the accompanying drawing: Figure 1 is a perspective view of a grain measuring chute constructed in accordance with my invention; Fig. 2 is a central vertical sectional view of the same showing the upper slide open and the lower or delivery slide closed; Fig. 3 is a similar view showing the upper slide closed and the lower slide open and taken on line 3—3 of Fig. 4. Fig. 4 is a vertical sectional view taken at right angles to Figs. 2 and 3 showing the deflecting board in one position in full lines and in its other position in dotted lines. Fig. 5 is a cross sectional view on the line 5—5 of Fig. 4.

Referring more particularly to the drawings 1 denotes the chute which may be of any desired length and in which at a suitable location is arranged a measuring chamber 2. In the present instance the chute is shown as having at its lower end oppositely projecting branch chutes or delivery tubes 3 which may extend to feed troughs or other places where it is desired to discharge the grain. At the lower end of the chute where the branch tubes join the same is arranged a valve or deflecting plate 4 which is pivoted in the center of the chute and is adapted to be swung in one direction or the other thereby closing the inner end of one or the other of the branch chutes or delivery tubes. The shaft of the deflecting plate 4 projects through one side of the chute and has formed theron a crank arm 5 to which is connected an operating cord 6 which may be passed over guide pulleys and extended to any desired place for operation of the plate. The operating cord 6 is provided to swing the deflecting plate in one direction said plate being swung in the other direction by a coiled spring 7 which is attached to said crank arm and to the adjacent side of the chute as shown.

In the upper portion of the measuring chamber 2 of the chute is slidably mounted a transversely disposed cut off plate 8 said plate being adapted to work through a slot 9 formed in one side of the chute. The plate 8 is slidably supported and operates between pairs of track bars 10 which are arranged on the inner sides of the chute and project a suitable distance beyond the outer side thereof to form supports and guides for the plate when in an open position. In the chute immediately above the plate 8 is preferably arranged an inclined grain deflecting board 11 which coacts with the plate in cutting off the flow of grain through the chute.

The plate 8 is projected and retracted into and out of operative position by means of a suitable operating mechanism comprising a pair of levers 12 which are pivotally connected to the opposite sides of the chute and which are bent outwardly and connected together at their lower ends by an integral cross piece thus forming a substantially bail shaped frame or yoke. Links 13 are connected at one end with the upper ends of the levers 12, and the opposite ends of said links are pivotally connected to the outer ends of the cut off plate 8 whereby when said levers are swung outwardly at their lower ends said cut off plates will be closed or pushed inwardly thereby cutting off the flow of grain through the chute. The levers 12 are operated to close the cut off plate by means of an operating cord or cable 14 which is connected at one end to the connecting cross piece of said levers and extends through suitable guide pulleys as 15 to any desired place of operation. The levers are retracted to open the cut off chute 8 when released by the cord or cable 14 by means of retracting springs 16 which are connected at one end to the levers and at their opposite ends to the sides of the chute as shown.

Adjustably mounted in the measuring chamber of the chute is a measuring box 17 in which is arranged an inclined grain deflecting board 18. The board 18 covers about one-half of the box while the other portion is covered by a grain delivering plate 19 which is slidably mounted in suitable guides or tracks arranged on the opposite sides of the box as shown. When the plate 19 is in a closed position said plate coacts with the deflecting plate 18 to form the bottom or lower side of the measuring box and when said board is in an open position or drawn back beneath the board 18 the grain in the box and measuring chamber above is permitted to pass on down through the chute. The upper edges of the opposite sides of the masuring box are provided with inclined grain deflecting plates 20 which cover the space between the box and the adjacent sides of the measuring chamber.

The delivery plate 19 is retracted to open the chamber of the feed box by means of an operating lever 21 which is pivotally connected to an eye bolt 22 which passes through a slot 23 in one side of the chute and is secured to the adjacent portion of the measuring box as shown. The lever 21 is connected to the plate 19 by an eyebolt 24 and to the free end of said lever 21 is connected a short cord or cable 25 the opposite end of which is connected to the operating cord or cable 14. The cord 25 is of such length that when the cord or cable 14 is pulled to close the upper or grain cut off plate said cord will, after the cut off plate has been closed, also open the delivery plate thus permitting the grain in the measuring chamber below the cut off plate to pass on through the chute. The delivery plate 19 is retracted to a closed position by suitable retracting springs 26 arranged between the sides of the chute box and the adjacent inner sides of the measuring chamber said retracting springs being connected at one end to the outer sides of the box and at their opposite ends to studs 27 which project through slots formed in the sides of the box and engage the opposite edges of the delivery plate as clearly shown in Fig. 5 of the drawings.

The feed box 17 is adjusted vertically in the measuring chamber to lengthen or shorten said chamber thus regulating the capacity thereof by means of the eye bolt 22 which projects through the slot 23 in the adjacent side of the measuring chamber. After the box has been adjusted to the desired position the same is fastened and rigidly held in place by a clamping bolt 27 which projects through the slot 23 and has a screw threaded engagement at its inner end with a clamping nut 28 arranged on the inner side of the box 17 as shown. The clamping bolt has an enlarged outer portion or head which forms a shoulder said shoulder being engaged with a plate or washer 29 which bears against the outer side of the measuring chamber or chute whereby when said bolt is screwed up into the nut the measuring box will be drawn or clamped into tight engagement with the adjacent side of the chute.

In order to prevent the escape of the grain in the measuring chamber through the slot 23 said slot is preferably closed by a metal cover plate 30 with which is provided a series of notches or slots 30' to receive the clamping bolt 27' and the eye bolt 22 and is laterally adjustable on said chute and is held in adjusted position by the said clamping bolt 27' which extends through one of the slots 30'. The bolt 27' is preferably provided with a pointer or indicating finger 31 which is adapted to coact with a scale of measurements 32 placed on the adjacent outer side of the measuring chamber whereby the proper position of the measuring box may be ascertained for measuring the desired quantity of grain to be discharged through the chute. The scale of measurements 32 preferably indicate quarts. If desired one side of the measuring chamber may be provided with a door 33 whereby access may be had to the interior of the measuring chamber when desired.

By means of a chute constructed as herein shown and described the upper end thereof may be connected with a grain bin in the loft of a barn while the lower end or branch tubes thereof may be connected with a feed box or trough in the lower portion of the barn. The measuring chamber may be arranged at any suitable location in the chute and the operating cables for the operating mechanism therein may be carried over suitable pulleys and extended to any desired place thus permitting the operation of the device at a distant point.

In the operation of this improved measuring chute the parts are normally in the position shown in Figs. 1 and 2 with the top slide 8 open and the bottom slide 19 closed, the box 17 having been adjusted in the chute to the desired position by first loosening the clamping bolt 27' and moving the plate 30 laterally by sliding it to the left to uncover the slot 23 and the box may then be moved to the desired height to adjust the measuring chamber to hold the quantity which is desired to be fed. The eyebolts 22 and 24 are then engaged with the slots 30' of the plate 30 and the bolt 27' is tightened up to clamp the parts in adjusted position. The operator may then discharge the contents from the measuring chamber by pulling on the cord 14, which draws the bail-shaped connecting member and the levers 12 upward, thereby moving the links 13 inward, and forcing the plate 8 inwardly across the chute 2, thereby cutting off the supply. A further pull exerted on the cord 14 is imparted to the cord 25 attached thereto and to the lever 21 drawing the lower end of said lever upward and withdrawing the plate 19 which forms the bottom closure for the box 17 and permits the grain to pass outwardly through either one of the branch pipes 3 according to the position in which the flap valve 4 is arranged. This valve 4 is controlled as above described, by means of an operating cord which is connected with the crank handle 5.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

In a grain chute a measuring chamber, a cut off plate slidably mounted therein, a spring retracted plate operating mechanism, an operating cable connected to said mechanism whereby said plate may be closed at a distant point from the chute, a measuring box adjustably mounted in said chamber whereby the capacity of said chamber is regulated, means to secure said box in its adjusted position, a delivery plate slidably mounted in said box, an operating lever connected with said plate whereby said plate is opened to permit the discharge of grain from said measuring chamber, springs to close said plate and an operating cable to connect said lever with the operating cable on said cut off plate whereby when the latter is closed said delivery plate will be opened.

In testimony whereof I have hereunto set my hand in presence of two subscribing witnesses.

HENRY DECREMER.

Witnesses:
JOHN HALL,
JOHN FUHRIMANN.

---

Copies of this patent may be obtained for five cents each, by addressing the "Commissioner of Patents, Washington, D. C."